(12) United States Patent
Tse et al.

(10) Patent No.: US 8,408,562 B1
(45) Date of Patent: Apr. 2, 2013

(54) GOLF BAG CART

(75) Inventors: Yuet Keung Tse, Hong Kong (HK); Chi Bun Tse, Hong Kong (HK); Michael Potempa, Freeport, IL (US)

(73) Assignee: Adept Industries Limited, Tsuen Wan (HK)

( * ) Notice: Subject to any disclaimer, the term of this patent is extended or adjusted under 35 U.S.C. 154(b) by 0 days.

(21) Appl. No.: 13/272,012

(22) Filed: Oct. 12, 2011

(51) Int. Cl.
*B62B 1/00* (2006.01)

(52) U.S. Cl. .................... 280/38; 280/47.26; 280/47.34

(58) Field of Classification Search .................. 280/638, 280/35, 639, 640, 37, 38, 641, 645, 646, 280/651, 655, 47.131, 47.17, 47.18, 47.2, 280/47.21, 47.24, 47.26, 47.34, DIG. 6
See application file for complete search history.

(56) References Cited

U.S. PATENT DOCUMENTS

| | | | | |
|---|---|---|---|---|
| 2,860,887 A * | 11/1958 | Stewart | .......................... | 280/641 |
| 5,232,065 A * | 8/1993 | Cotton | ............................ | 180/11 |
| 6,000,712 A * | 12/1999 | Wu | ................................ | 280/639 |
| 6,120,053 A * | 9/2000 | DeAngelis | ..................... | 280/641 |
| 6,168,174 B1 * | 1/2001 | MacDougall | ............... | 280/47.34 |
| 6,283,238 B1 * | 9/2001 | Royer et al. | .................. | 180/19.1 |
| 6,364,328 B1 * | 4/2002 | Stahler, Sr. | ................ | 280/47.18 |
| 7,063,340 B1 * | 6/2006 | Wu | .............................. | 280/47.26 |
| 7,591,479 B2 * | 9/2009 | Golias | ........................... | 280/647 |
| 7,862,053 B2 * | 1/2011 | Liao | ........................... | 280/47.34 |
| 2010/0052275 A1 * | 3/2010 | Reimers et al. | ............. | 280/47.26 |
| 2011/0215542 A1 * | 9/2011 | Wang | ............................. | 280/35 |

* cited by examiner

*Primary Examiner* — John Walters
*Assistant Examiner* — Brian Swenson
(74) *Attorney, Agent, or Firm* — William J. Sapone

(57) ABSTRACT

A golf bag cart includes a body for engaging a golf bag. The body has a first longitudinal end and an opposite second longitudinal end. A first pair of wheels is rotatable about a first axis of rotation at or adjacent the second longitudinal end, a second pair of wheels rotatable about a second axis of rotation which is pivotable relative to the body between a folded position and an outstretched position. When the second axis of rotation is in the outstretched position, the first and second wheel pairs support the body in a slanted orientation. When the second axis of rotation is in the folded position, the first and second wheel pairs support the body in a generally horizontal orientation. When the second axis of rotation moves from the outstretched position to the folded position, the second axis of rotation moves away from the first axis of rotation.

16 Claims, 26 Drawing Sheets

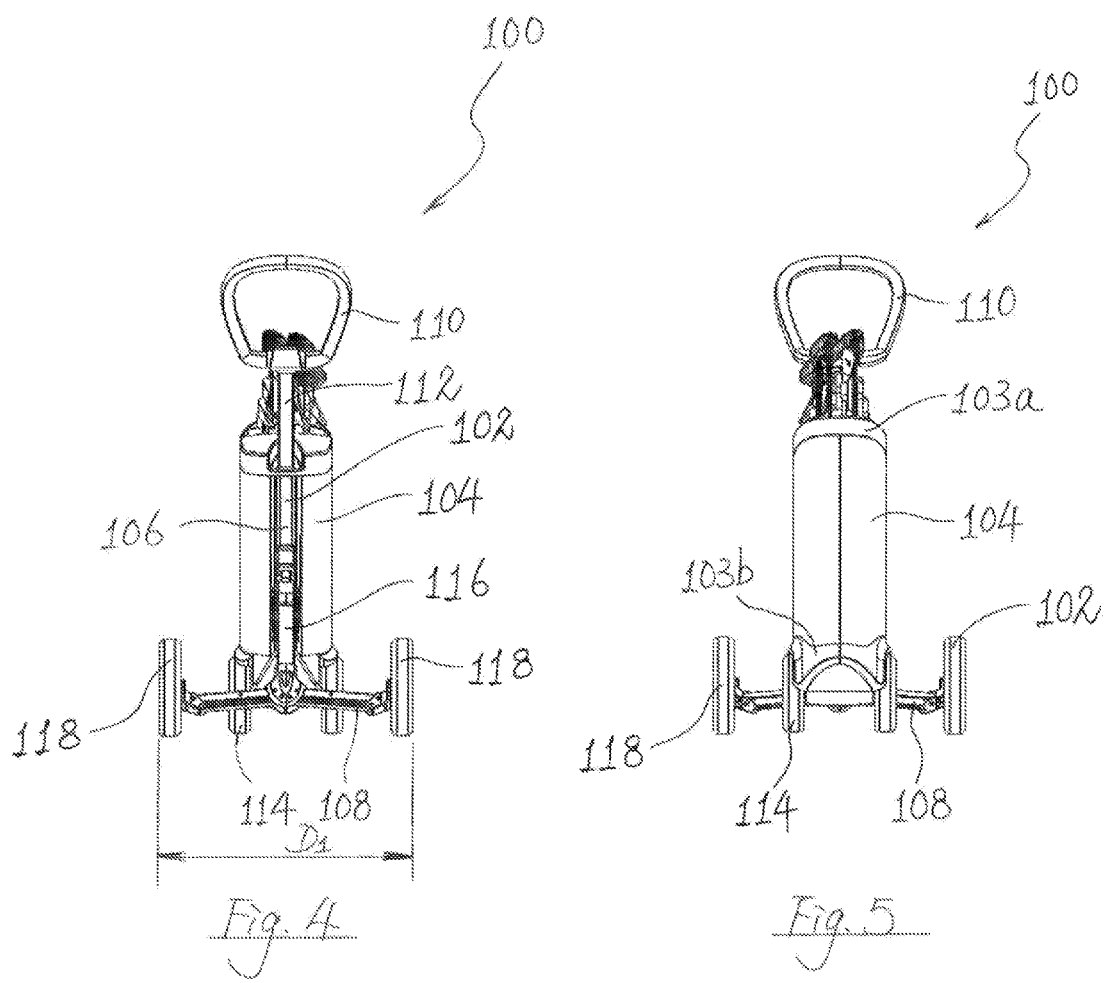

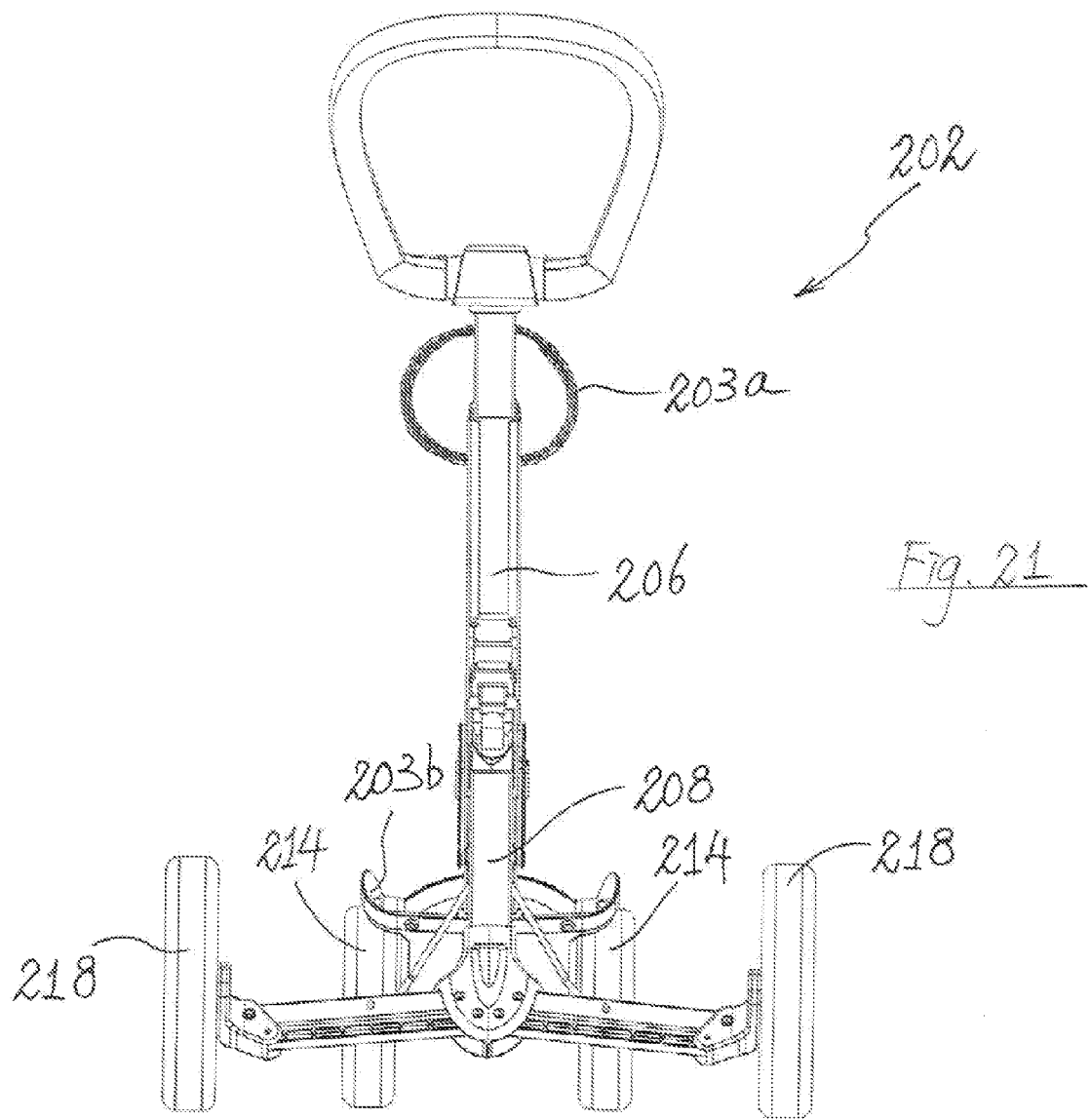

GOLF BAG CART

FIELD OF THE INVENTION

This invention relates to a golf bag cart, in particular such a cart which is movable between a collapsed configuration and an expanded configuration. This invention also relates to a golf bag cart unit forming part of such a golf bag cart.

BACKGROUND OF THE INVENTION

There are in existence various golf bag carts and golf bag cart units on which a golf bag is or may be engaged. To enhance versatility in use, some of such golf bag carts and cart units are operable (e.g. by a user) to move between a collapsed configuration (in which it may be placed in a boot of a car) and an expanded configuration (in which it may be towed to move along a surface, e.g. on a golf field). It is found that even when such a conventional golf bag cart or cart unit is in the collapsed configuration, it (including the golf bag attached to it) still occupies a relatively large space, and therefore is not compact enough for storage in a boot of a car. A user then has to detach the golf bag from the cart, and place the bag on the rear seat, while leaving the cart unit in the boot. Such thus adds to the inconvenience in using such a convention golf bag cart or cart unit. In addition, it is found that the force required to move the golf bag cart or golf bag cart unit between the collapsed configuration and the expanded configuration is rather large, thus making it difficult or uncomfortable to use, e.g. by women or the elderly.

It is thus an object of the present invention to provide a golf bag cart unit and a golf bag cart in which the aforesaid shortcomings are mitigated, or at least to provide a useful alternative to the public.

SUMMARY OF THE INVENTION

According to a first aspect of the present invention, there is provided a golf bag cart unit including a body to which a bag is engageable, said body having a first longitudinal end and an opposite second longitudinal end, a first pair of wheels rotatable about a first axis of rotation at or adjacent said second longitudinal end of said body, a second pair of wheels rotatable about a second axis of rotation which is pivotable relative to said body between a folded position and an outstretched position, wherein when said second axis of rotation is in said outstretched position, said first pair of wheels and said second pair of wheels are adapted to support said body in a slanted orientation, wherein when said second axis of rotation is in said folded position, said first pair of wheels and said second pair of wheels are adapted to support said body in a generally horizontal orientation, and wherein when said second axis of rotation moves from said outstretched position to said folded position, said second axis of rotation moves away from said first axis of rotation.

According to a second aspect of the present invention, there is provided a golf bag cart including a golf bag cart unit engaged with a bag, wherein said golf bag cart unit includes a body to which a bag is engageable, said body having a first longitudinal end and an opposite second longitudinal end, a first pair of wheels rotatable about a first axis of rotation at or adjacent said second longitudinal end of said body, a second pair of wheels rotatable about a second axis of rotation which is pivotable relative to said body between a folded position and an outstretched position, wherein when said second axis of rotation is in said outstretched position, said first pair of wheels and said second pair of wheels are adapted to support said body in a slanted orientation, wherein when said second axis of rotation is in said folded position, said first pair of wheels and said second pair of wheels are adapted to support said body in a generally horizontal orientation, and wherein when said second axis of rotation moves from said outstretched position to said folded position, said second axis of rotation moves away from said first axis of rotation.

BRIEF DESCRIPTION OF THE DRAWINGS

Embodiments of the present invention will now be described, by way of examples only, with reference to the accompany drawings in which:

FIG. 4 is a rear view of the golf bag cart of FIG. 1;

FIG. 5 is a front view of the golf bag cart of FIG. 1;

FIG. 21 is a rear view of a golf bag cart unit according to a further preferred embodiment of the present invention, in a fully-expanded configuration;

DESCRIPTION OF THE PREFERRED EMBODIMENTS

Figure 1:
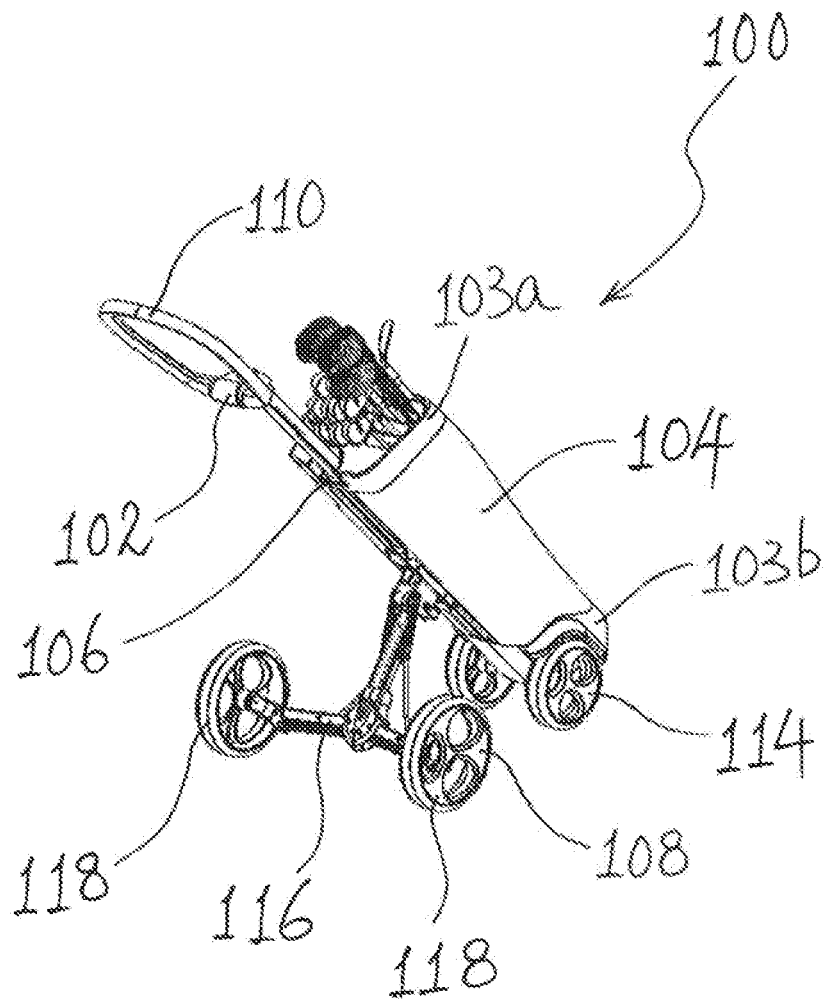
FIG. 1 is a perspective view of a golf bag cart according to a preferred embodiment of the present invention, in a fully-expanded configuration.
Figure 2:
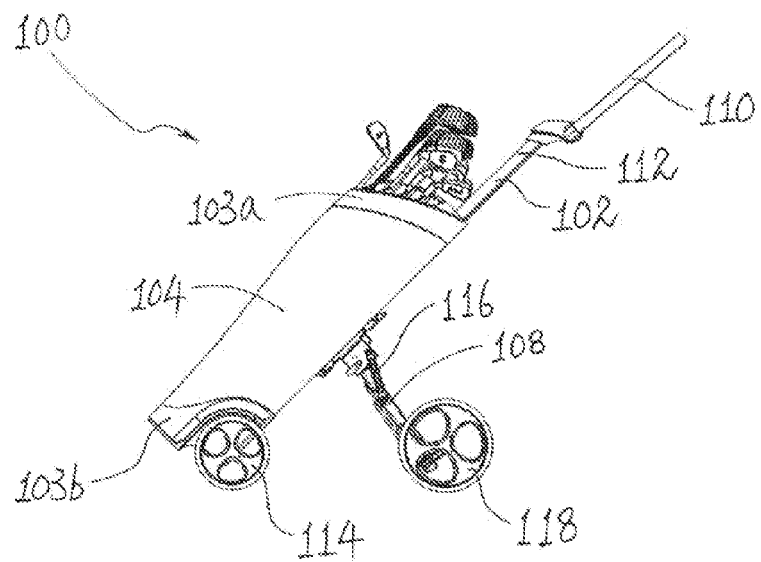
FIG. 2 is a side view of the golf bag cart of FIG. 1.

A golf bag cart according to a preferred embodiment of the present invention is shown in FIGS. 1 to 7 and generally designated as 100. The golf bag cart 100 is shown in FIGS. 1 to 7 as being in a fully-expanded configuration.

The golf bag cart 100 includes a golf bag cart unit 102 to which a golf bag 104 is engaged. The golf bag 104 may be fixedly or detachably engaged with the golf bag cart unit 102. The golf bag 104 may be fixedly engaged with the golf bag cart unit 102 between an upper bracket 103a and a lower bracket 103b.

The golf bag cart unit 102 includes a body 106 (which includes an elongate extrusion) to which a rear wheel unit 108 is detachably engaged. The upper bracket 103a and lower bracket 103b are fixedly engaged with the body 106. An upper longitudinal end of the body 106 is engaged with a handle 110 via a rod 112. The rod 112 is telescopically received within the body 106 for relative length-wise sliding movement. The handle 110 is pivotable relative to the rod 112, and thus relative to the body 106.

To an opposite, lower longitudinal end of the body 106 is fixed a spindle to which a pair of front wheels 114 are attached for free rotation. The front wheels 114 are thus rotatable about an axis $L_F$-$L_F$ which is fixed relative to the body 106.

The rear wheel unit 108 has a linkage mechanism 116, and a pair of rear wheels 118 freely rotatable about a common axis of rotation $L_R$-$L_R$ which is parallel to the axis of rotation $L_F$-$L_F$ of the pair of front wheels 114. In FIGS. 1 to 7, the golf bag cart 100 (with the golf bag cart unit 102) is shown in its fully-expanded configuration, and the pair of rear wheels 118 and their common axis of rotation $L_R$-$L_R$ are in their respective fully-outstretched position.

It can be seen that when the golf bag cart 100 is in this fully-expanded configuration (and in which the pair of rear wheels 118 and the axis $L_R$-$L_R$ are in their respective fully-outstretched position), the pair of front wheels 114 and the pair of rear wheels 118 may rest on a support surface (e.g. the ground) and support the body 106 (and thus the golf bag 104) in a slanted orientation.

In addition, when the pair of rear wheels 118 and the axis $L_R$-$L_R$ are in their respective fully-outstretched position, the distance $D_1$ (see FIG. 4) between the outer rims of the pair of rear wheels 118 is larger than the distance d (see FIG. 7) between the outer rims of the pair of front wheels 114. This arrangement provides a broad base for supporting the body 106 and the golf bag 104, e.g. during movement.

Figure 3:
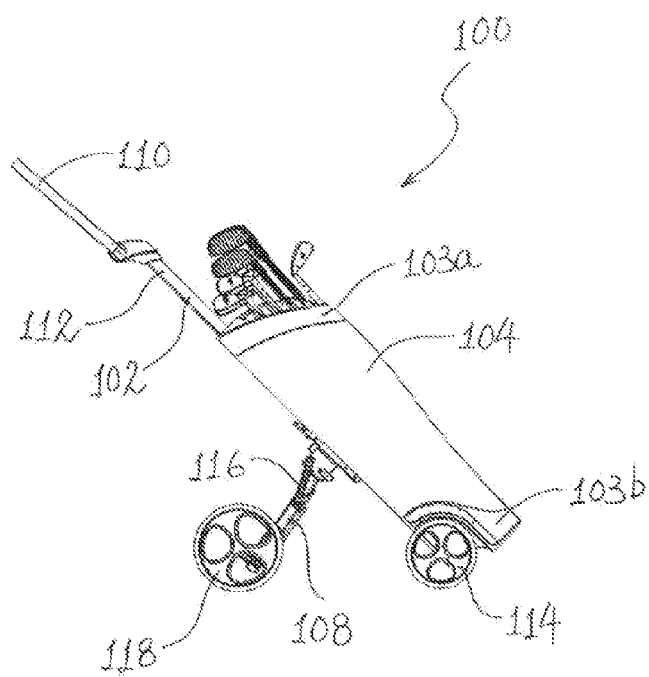
FIG. 3 is another side view of the golf bag cart of FIG. 1.
Figure 6:
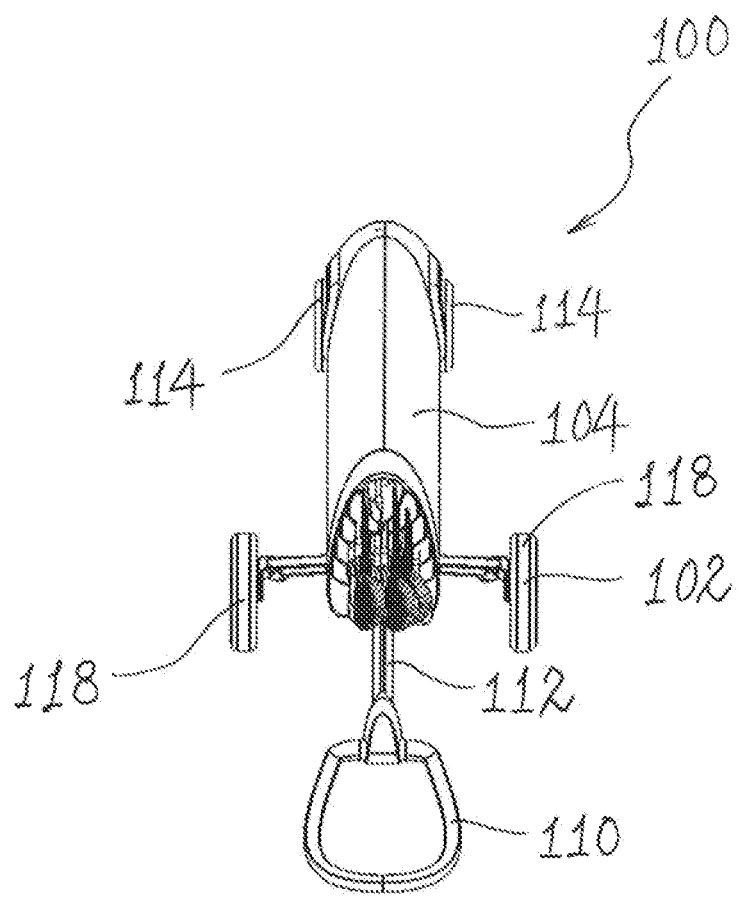
FIG. 6 is a top view of the golf bag cart of FIG. 1.
Figure 7:
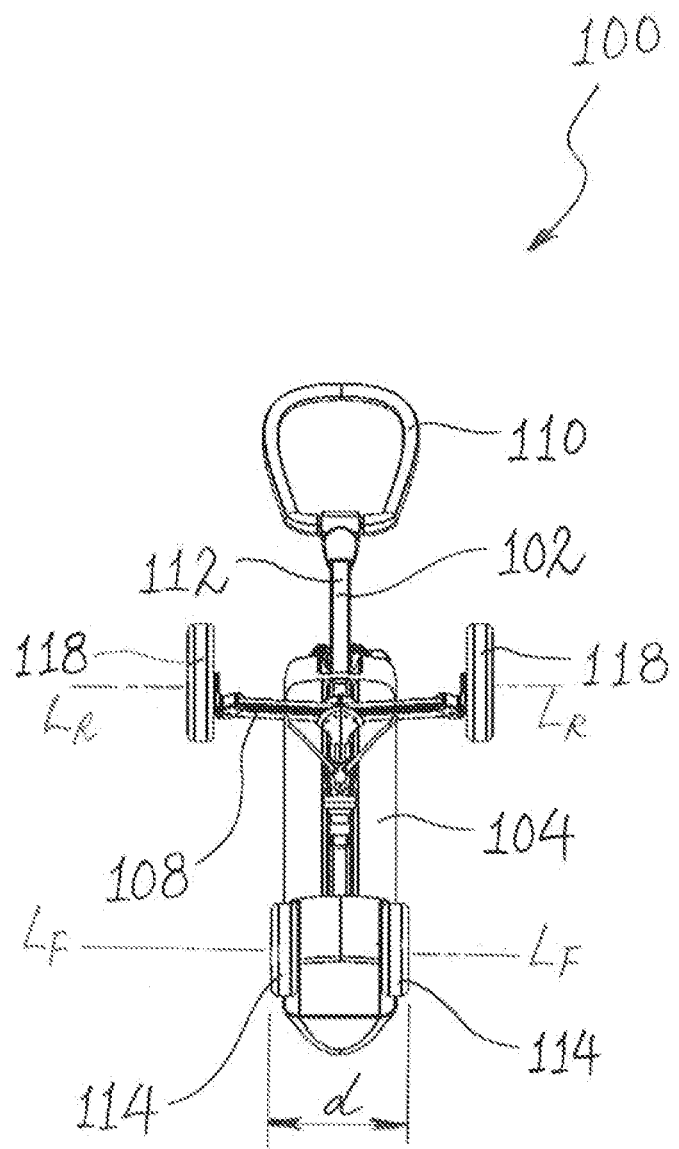
FIG. 7 is a bottom view of the golf bag cart of FIG. 1.
Figure 8:
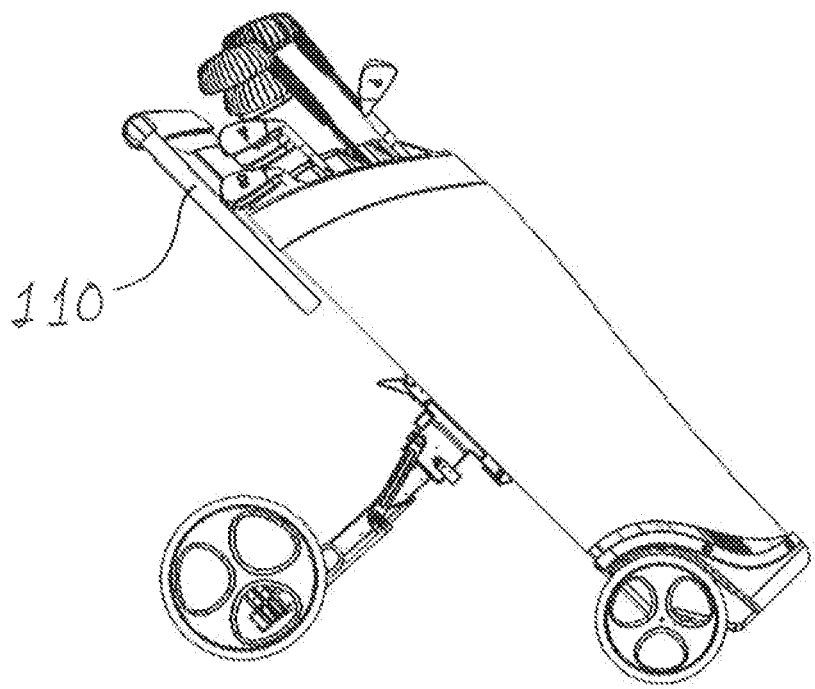
FIG. 8 shows the golf bag cart of FIG. 3 with the handle in a folded and partly-retracted position.
Figure 9:
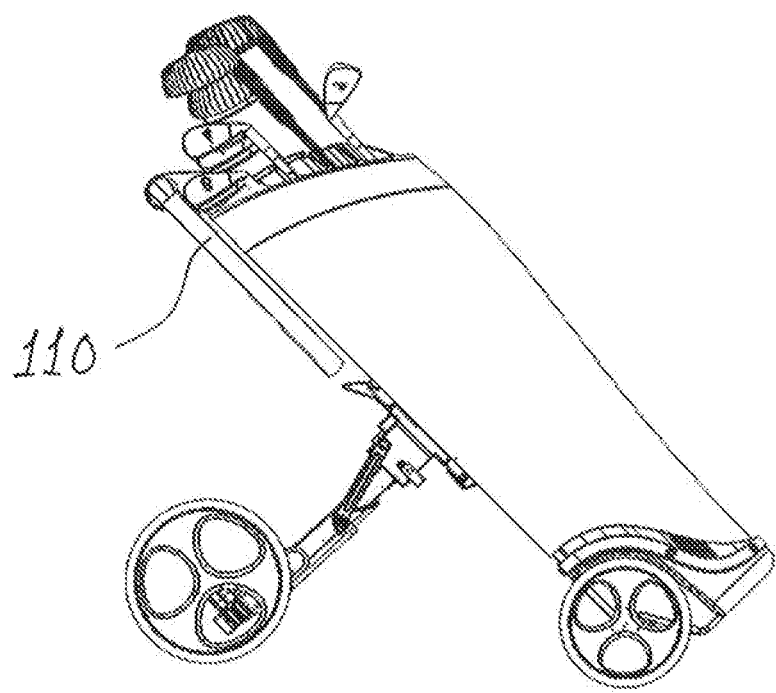
FIG. 9 shows the golf bag cart of FIG. 8 with the handle in a folded and fully-retracted position.

The handle 110 may be pivoted relative to the rod 112 (and thus relative to the body 106) from the position shown in FIG. 3 to the position shown in FIG. 8. The rod 112 may be slid into and relative to the body 106 from the position shown in FIG. 3 to the position shown in FIG. 8, and further to the position shown in FIG. 9.

Figure 10:
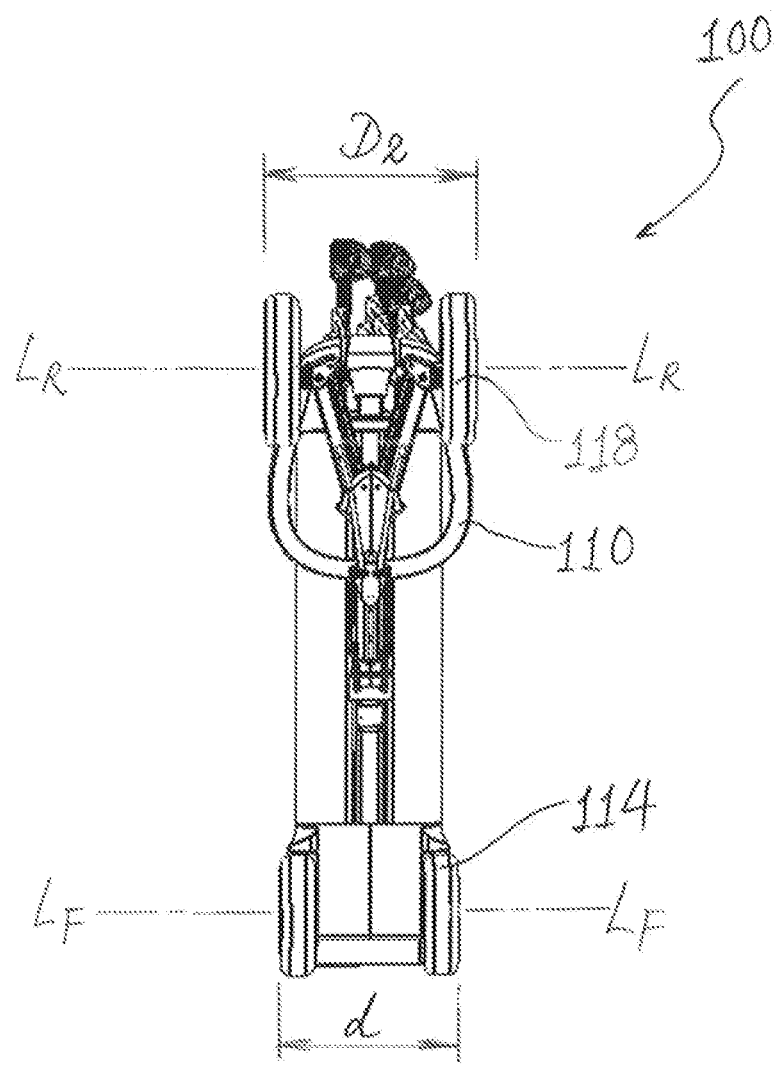
FIG. 10 shows the golf bag cart of FIG. 1 in a fully-collapsed configuration.
Figure 11:
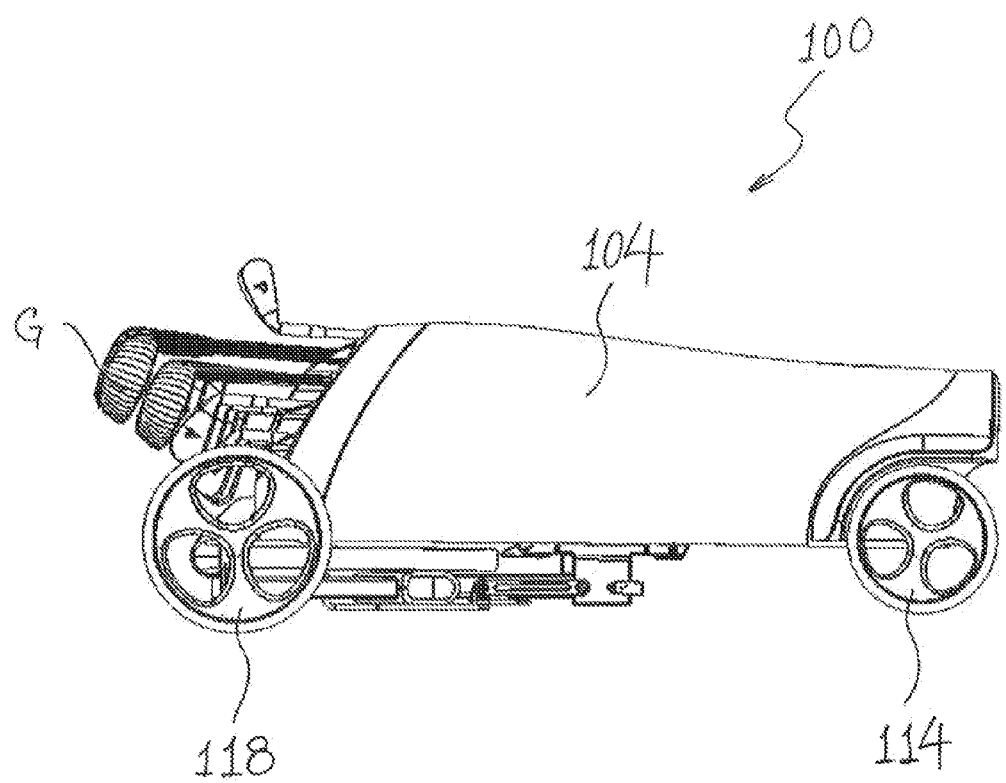
FIG. 11 is a side view of the golf bag cart of FIG. 10.

The golf bag cart unit 102 (and thus the golf bag cart 100) is movable to the fully-collapsed configuration as shown in FIGS. 10 and 11, in which the pair of rear wheels 118 and the axis $L_R$-$L_R$ are in their respective fully-folded position. The pair of rear wheels 118 and the axis $L_R$-$L_R$ are moved to this fully-folded position by pivoting the rear wheels 118 and the axis $L_R$-$L_R$ relative to the body 106 away from the front wheels 114 and the axis $L_F$-$L_F$ and towards the upper longitudinal end of the body 106.

It can be seen that, when the pair of rear wheels 118 and the axis $L_R$-$L_R$ are in this fully-folded position, as shown in FIGS. 10 and 11:

a. the rear wheels 118 have moved towards each other, and the distance $D_2$ (see FIG. 10) between the outer rims of the pair of rear wheels 118 is very close to or identical to the distance d between the outer rims of the pair of front wheels 114, which remains unchanged;

b. the pair of rear wheels 118 are at or adjacent the upper longitudinal end of the body 106;

c. the total length of the golf bag cart 100 is not longer than the length of a standard driver, which is the longer golf club. The length of a standard driver is forty-seven inches. Some taller golfers use longer standard drivers of forty-nine to fifty inches. For ladies, their standard drivers are a few inches shorter. Thus, the total length of the golf bag cart 100 (when in the fully-collapsed configuration) is no more than fifty inches, and preferably no more than forty-seven inches;

d. the pair of front wheels 114 and the pair of rear wheels 118 can support the body 106 (and thus the golf bag 104 carried by it) in a generally horizontal orientation (as shown in FIG. 11); and e. the axis $L_R$-$L_R$ about which the rear wheels 118 rotate remains parallel to the axis of rotation $L_F$-$L_F$ of the front wheels 114.

It can be seen that when the golf bag cart 100 is in its fully-folded configuration, it is very compact and its whole length is no longer than the longest golf club G carried by the golf bag 104. The width of the golf bag cart 100 is the same as or only slightly larger than the distance d between the outer rims of the pair of front wheels 114. The pair of front wheels 114 and the pair of rear wheels 118 can stably support the body 106 and the golf bag 104 above a support surface (e.g. the floor of a boot of a car) in a generally horizontal orientation. A user may therefore place the golf bag cart 100 (with the golf bag 104 attached) in the boot of his car for safe transport (without having to detach the golf bag 104 from the cart unit 102). If the car is a medium-sized car, it may even be possible to place two such golf bag carts 100 (each with a golf bag 104 attached) in the boot of the car.

As most golf bags 104 have one or more side pockets (not shown), and as when the pair of rear wheels 118 and the axis $L_R$-$L_R$ are in their respective fully-folded position, the pair of rear wheels 118 are at or adjacent the upper longitudinal end of the body 106, such side pockets are between the rear wheels 118 and the front wheels 114. This allows full use of and easy access to the side pockets of the golf bags 104 whether the golf bag cart is in the collapsed configuration or the expanded configuration.

Figure 12:
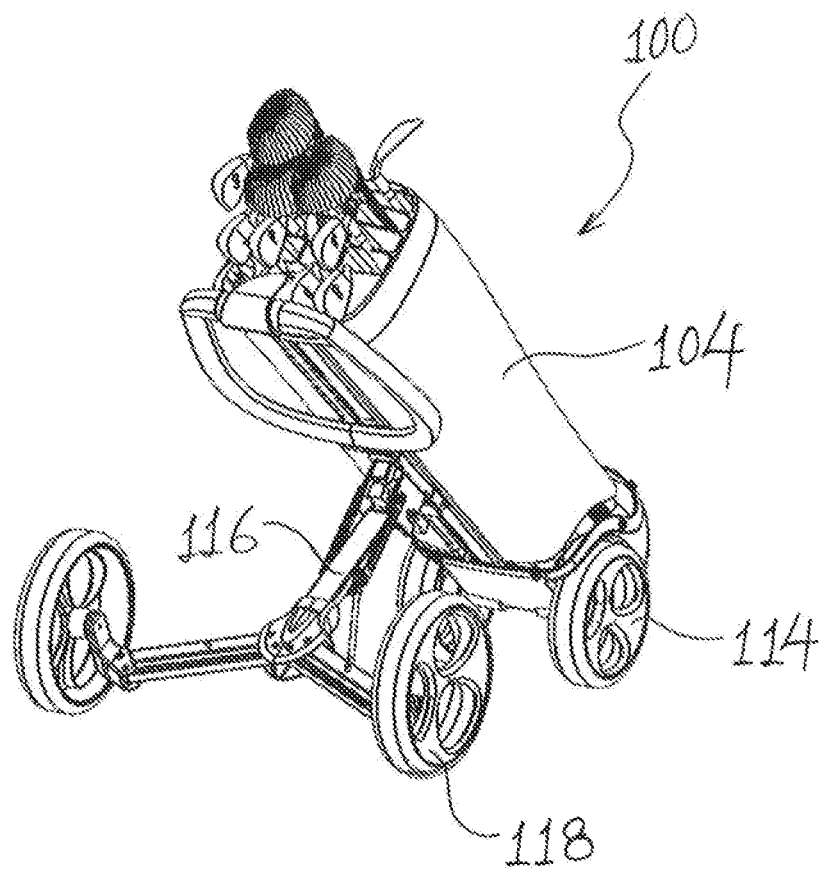
FIG. 12 is a perspective view of the golf bag cart of FIG. 1 in a first partly-collapsed configuration.
Figure 13:
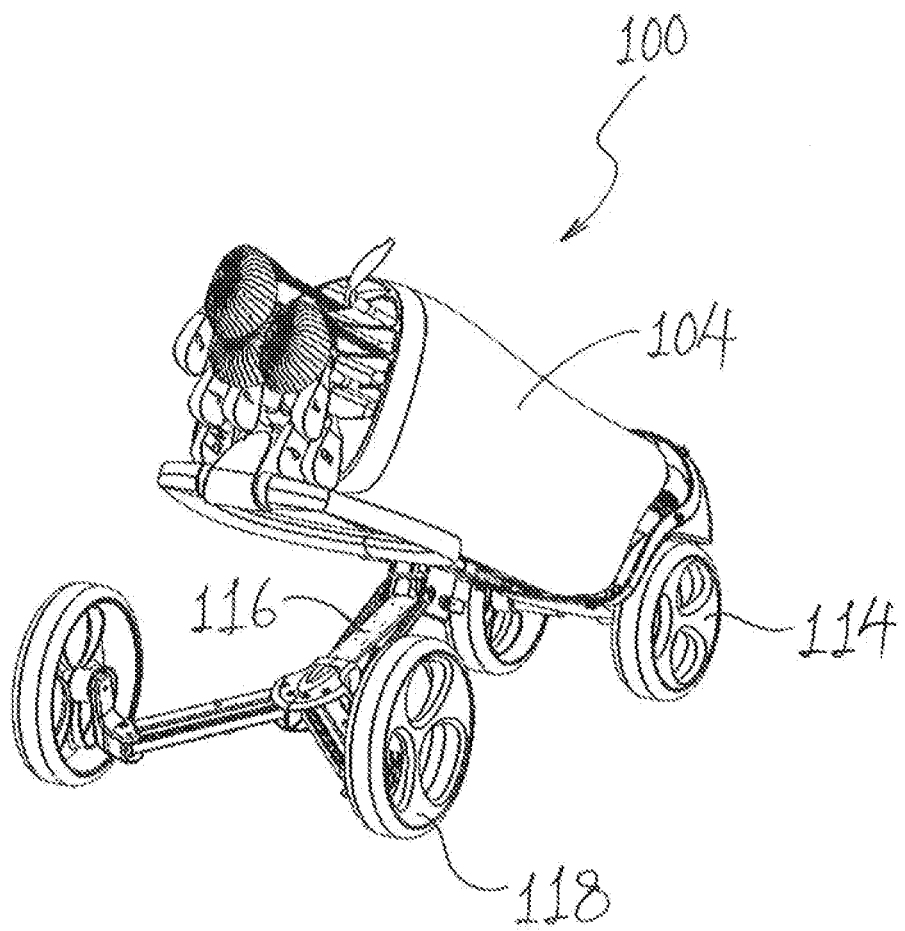
FIG. 13 is a perspective view of the golf bag cart of FIG. 12 in a second partly-collapsed configuration.

Referring to FIGS. 12 and 13, because of the construction of the linkage mechanism 116 of the golf bag cart unit 102 (to be discussed below), it is possible, in an ergonomic manner, to easily move the golf bag cart 100 from its fully-expanded configuration as shown in FIG. 1, through a first partly-collapsed configuration as shown in FIG. 12, and subsequently to a second, further, partly-collapsed configuration as shown in FIG. 13, until it reaches the fully-collapsed configuration as shown in FIGS. 10 and 11. In particular, a user may push the golf bag 104 downwardly towards the ground by his/her hand (may be partly assisted by using his/her own weight) to activate the linkage mechanism 116 to move the golf bag cart 100 all the way from its fully-expanded configuration to its fully-collapsed configuration. It is also possible for the user to lift the golf bag 14 upwardly away from the ground by his/her hand to activate the linkage mechanism 116 to move the golf bag cart 100 all the way from its fully-collapsed configuration to its fully-expanded configuration.

Figure 14:
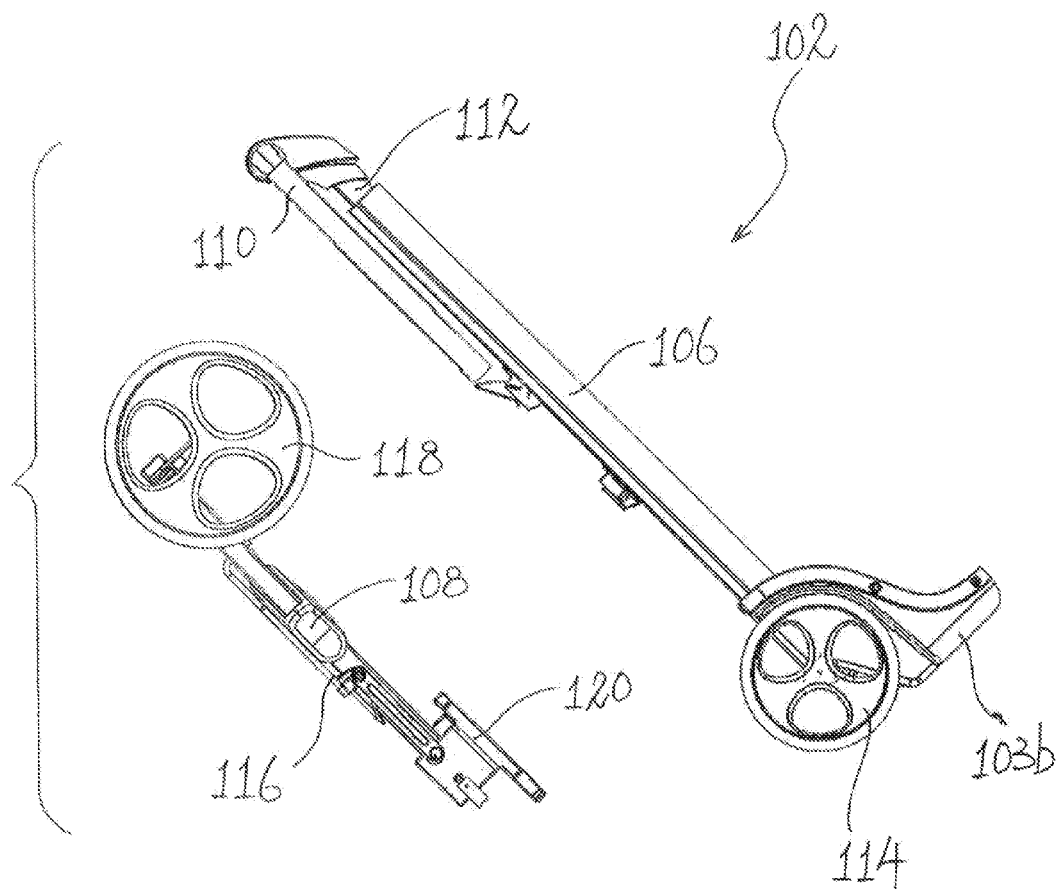
FIG. 14 is an exploded side view of a golf bag cart unit forming the golf bag cart of FIG. 1.

FIG. 14 shows the body 106 and rear wheel unit 108 of the golf bag cart unit 102 detached from each other. The rear wheel unit 108 carries the pair of rear wheels 118, the linkage mechanism 116, an attachment part 120 and a pivot lock 121. The pivot lock 121 may be movable, e.g. manually, between a latched position and an un-latched position. When the pivot lock 121 is in the un-latched position, the pair of rear wheels 118 may be pivoted relative to the attachment part 120 about an axis $L_P$-$L_P$. When the pivot lock 121 is in the latched position, the pair of rear wheels 118 cannot pivot relative to the attachment part 120 about the axis $L_P$-$L_P$.

Figure 15:
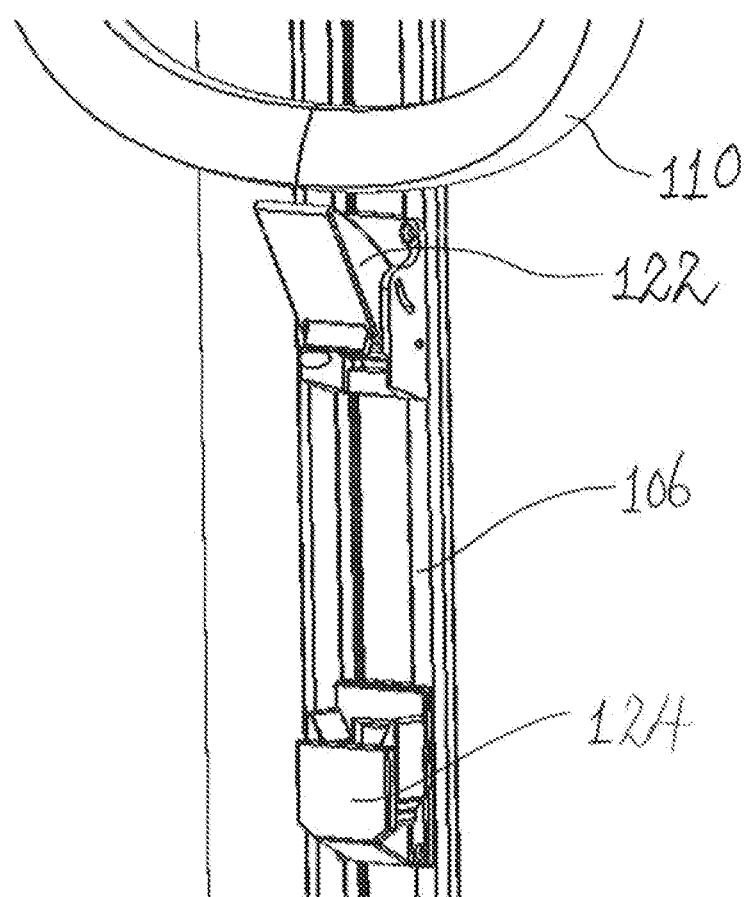
FIG. 15 is an enlarged view of the part on the body of the golf bag cart unit of FIG. 14 to which the rear wheel unit in FIG. 14 is releasably attachable.
Figure 16:
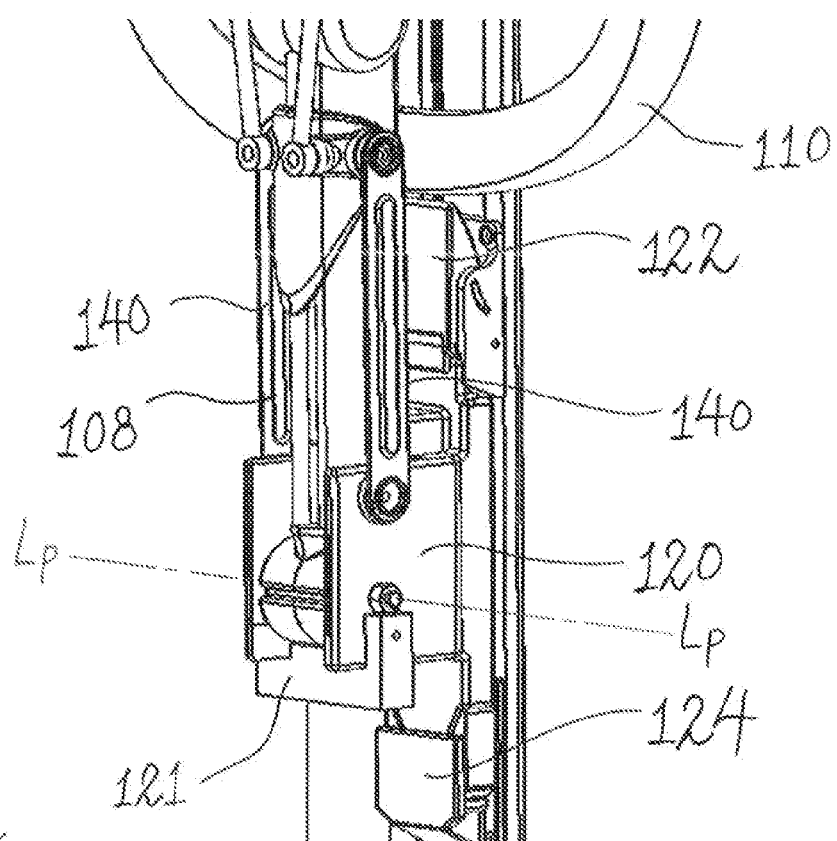
FIG. 16 is an enlarged view showing engagement of the rear wheel unit with the body of the golf bag cart unit of FIG. 15.

As shown more clearly in FIG. 15, the body 106 includes an upper receiver 122 and a lower receiver 124. As can be seen in FIG. 16, the attachment part 120 of the rear wheel unit 108 can be releasably secured between the upper receiver 122 and lower receiver 124. When the rear wheel unit 108 is thus releasably engaged with the body 106, and if the pivot lock 121 is in the un-latched position, the pair of rear wheels 118 may be pivoted relative to the attachment part 120, and thus relative to the body 106 about the axis $L_P$-$L_P$, which is fixed relative to the body 106 and parallel to the axes $L_R$-$L_R$ and $L_F$-$L_F$.

Figure 17A:
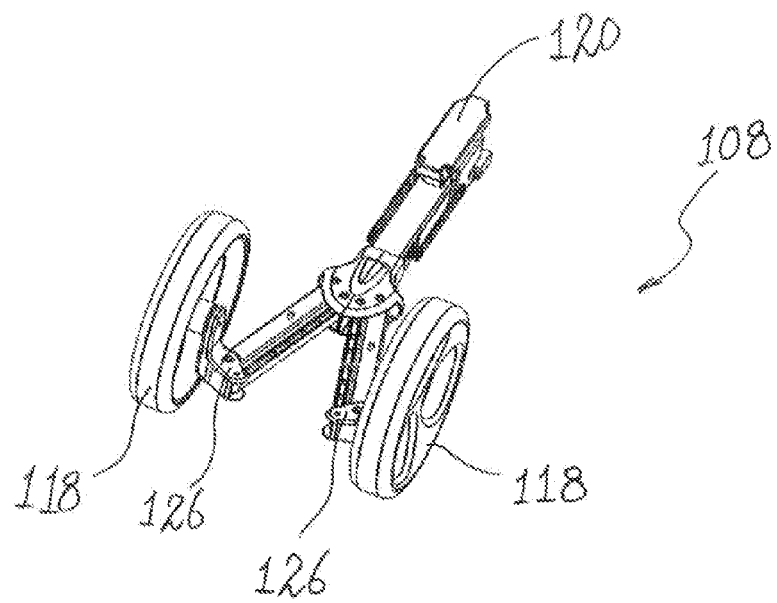
FIG. 17A is a perspective view of the rear wheel unit of the golf bag cart unit of FIG. 14, in which the rear wheel unit is in the fully-folded configuration.
Figure 17B:
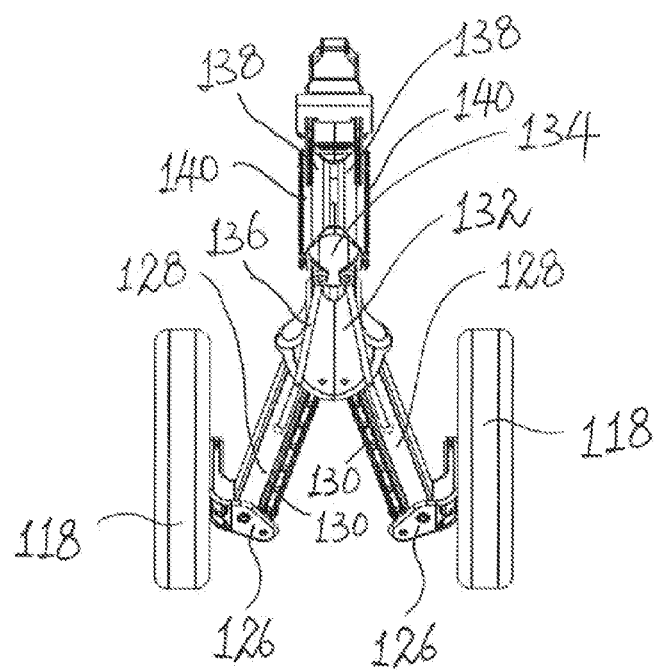
FIG. 17B is a front view of the rear wheel unit of FIG. 17A.
Figure 17C:
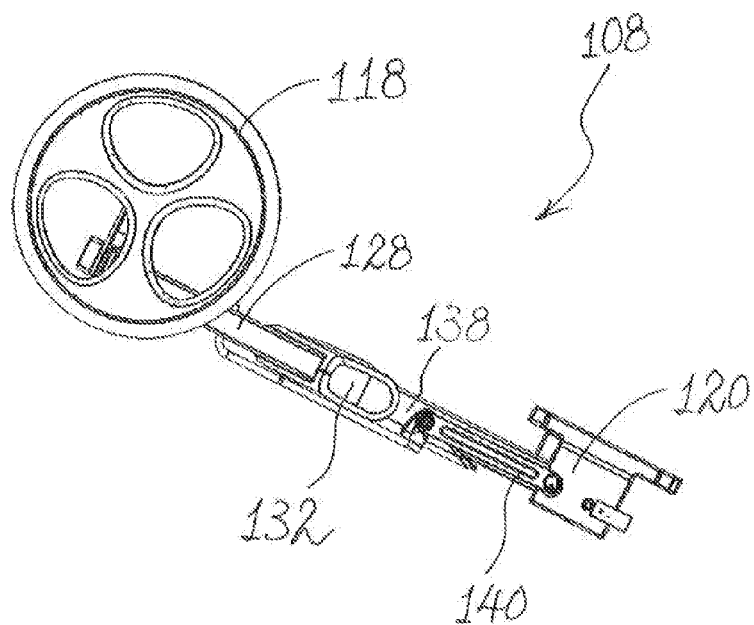
FIG. 17C is a side view of the rear wheel unit of FIG. 17A.

As can be seen in FIGS. 17A to 17C, each of the rear wheels 118 is engaged with the linkage mechanism 116 via a respective wheel fitting 126. Each of the rear wheel fitting 126 is engaged via a respective outrigger tube 128 and a rod 130 which is parallel to the outrigger tube 128. A respective longitudinal end of each of the outrigger tube 128 and rod 130 is engaged with a lower hub 132 for relative pivotal movement. A point along the length of each of the outrigger tube 128 is attached to a slide block 134 via a respective pull rod 136. The linkage mechanism 116 is engaged with the attachment part 120 for relative pivotal movement about the axis $L_P$-$L_P$ via a pair of lower tubes 138 and a pair of push rods 140. A gas spring (not shown) is placed within each of the lower tubes 138.

Figure 18A:
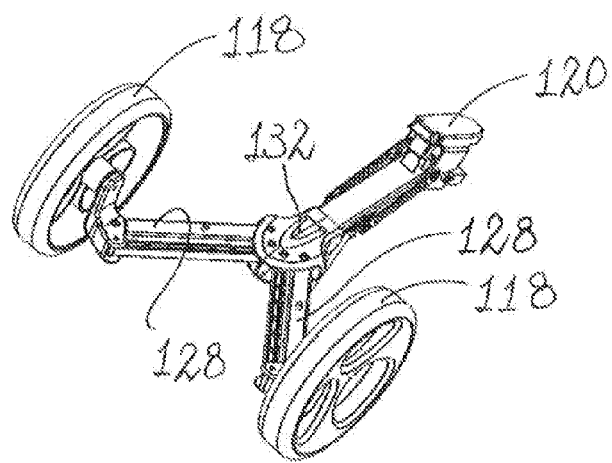
FIG. 18A is a perspective view of the rear wheel unit of FIG. 17A in a partly-outstretched configuration.
Figure 18B:
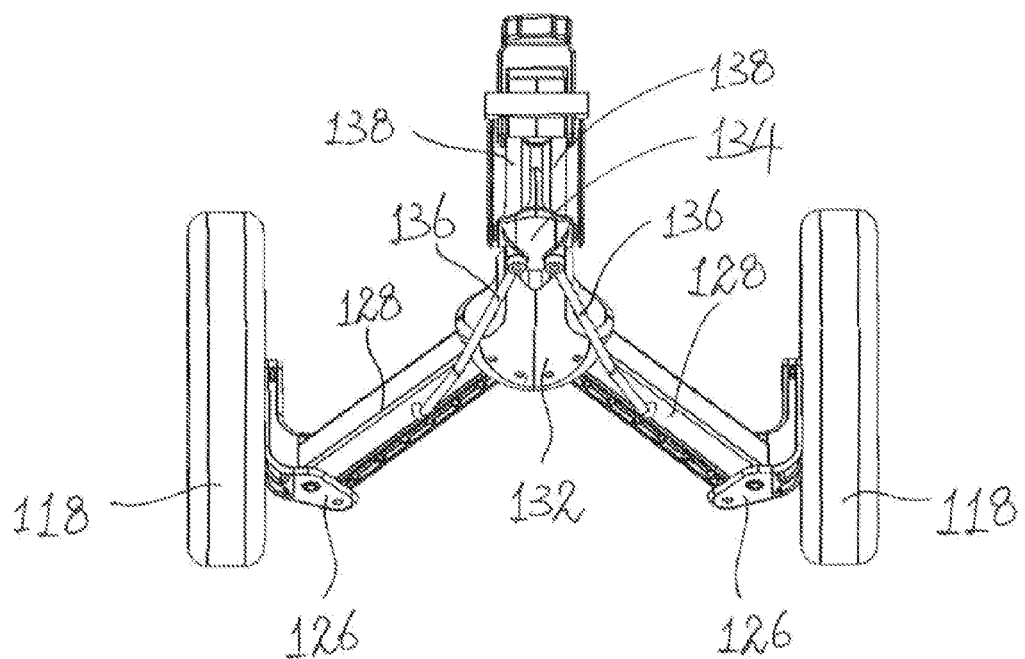
FIG. 18B is a front view of the rear wheel unit of FIG. 18A.
Figure 18C:
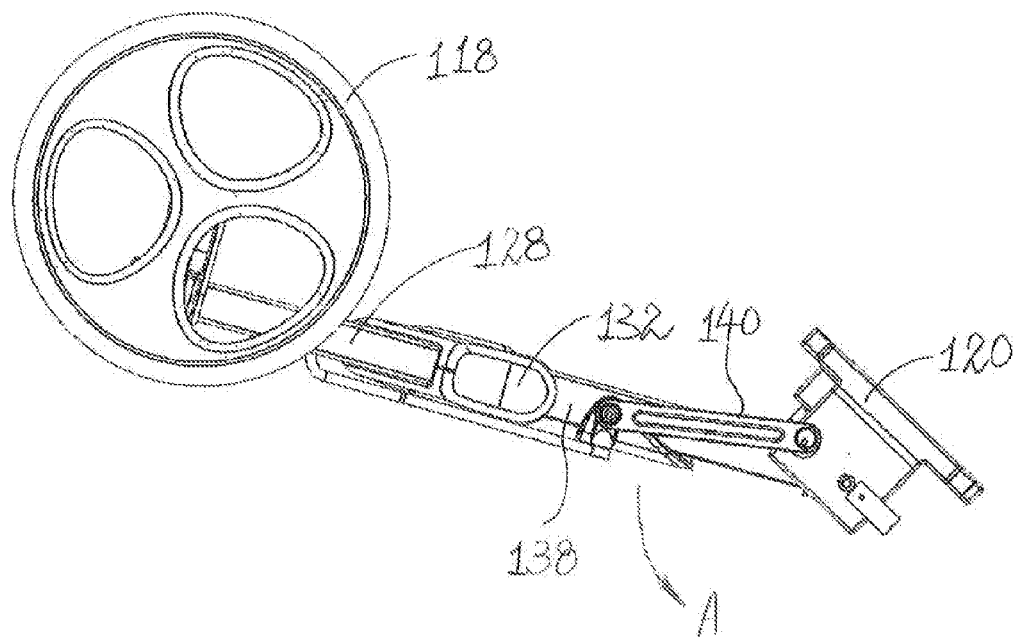
FIG. 18C is a side view of the rear wheel unit of FIG. 18A.
Figure 19A:
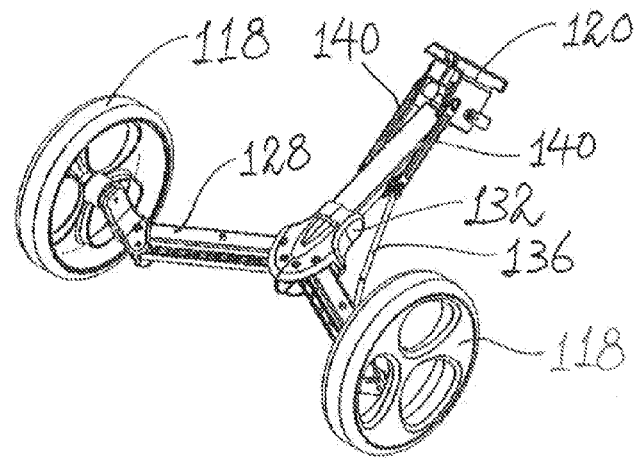
FIG. 19A is a perspective view of the rear wheel unit of FIG. 17A in a further outstretched configuration.
Figure 19B:
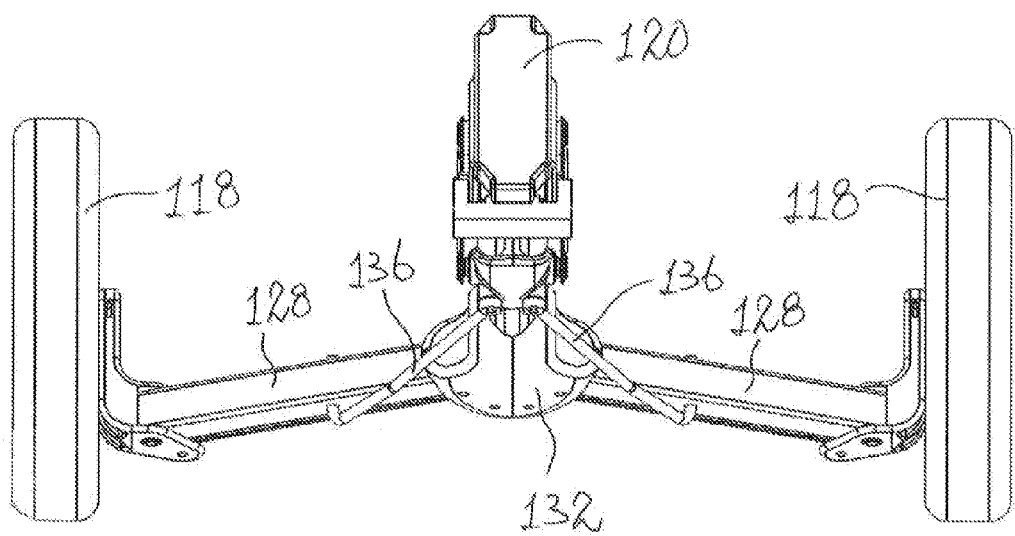
FIG. 19B is a front view of the rear wheel unit of FIG. 19A.
Figure 19C:
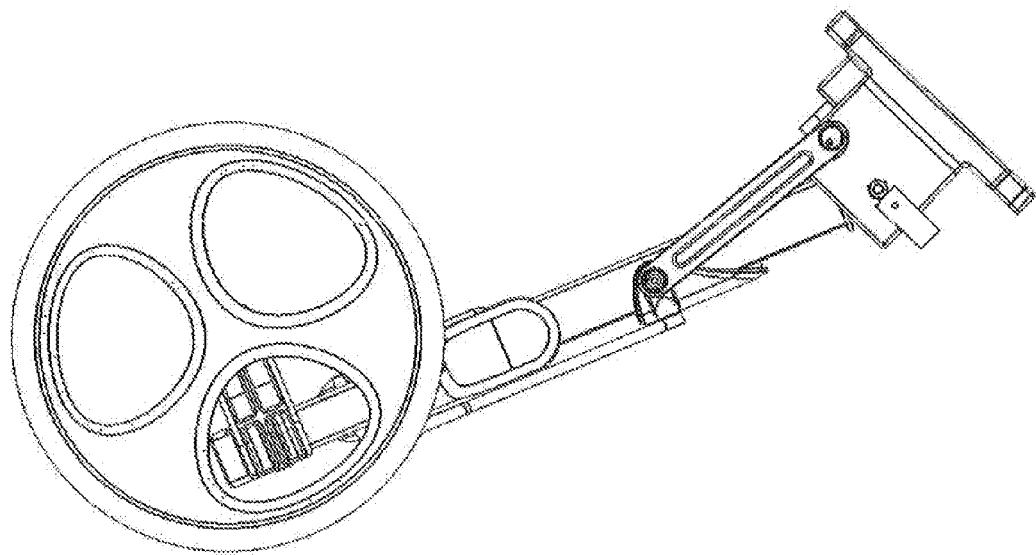
FIG. 19C is a side view of the rear wheel unit of FIG. 19A.
Figure 20A:
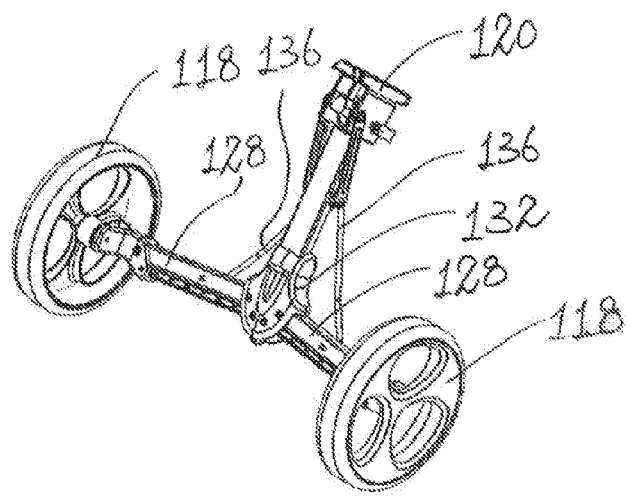
FIG. 20A is a perspective view of the rear wheel unit of FIG. 17A in a fully-outstretched configuration.
Figure 20B:
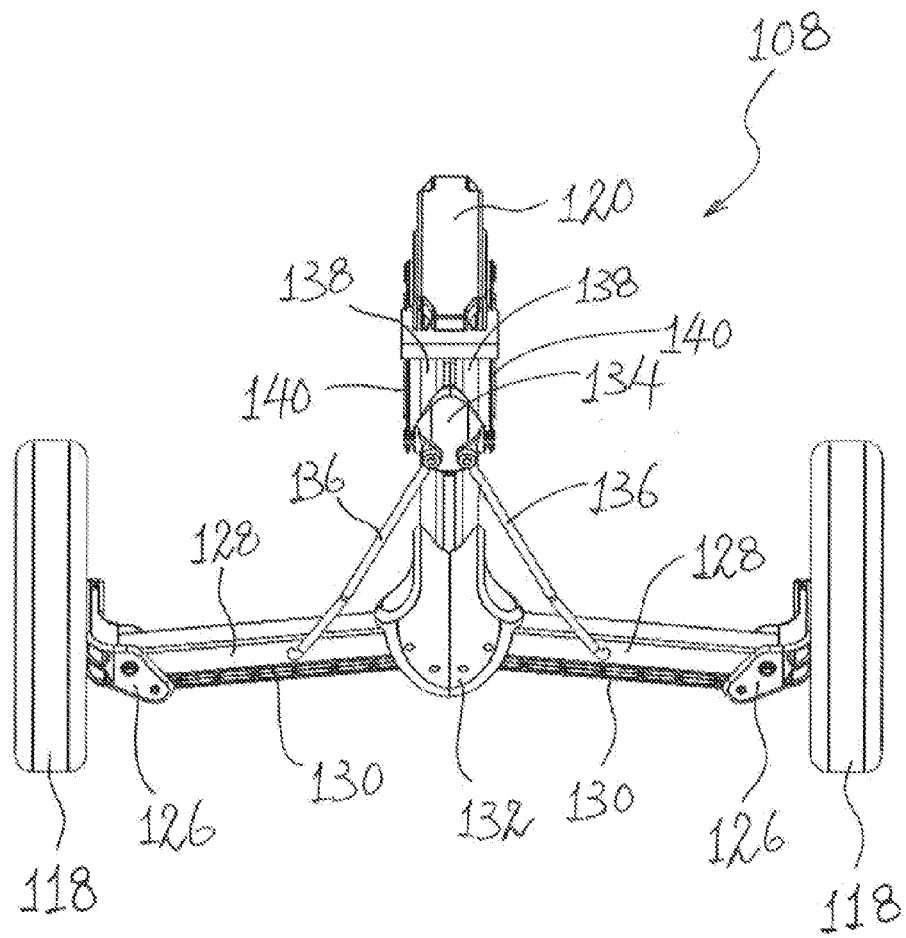
FIG. 20B is a front view of the rear wheel unit of FIG. 20A.
Figure 20C:
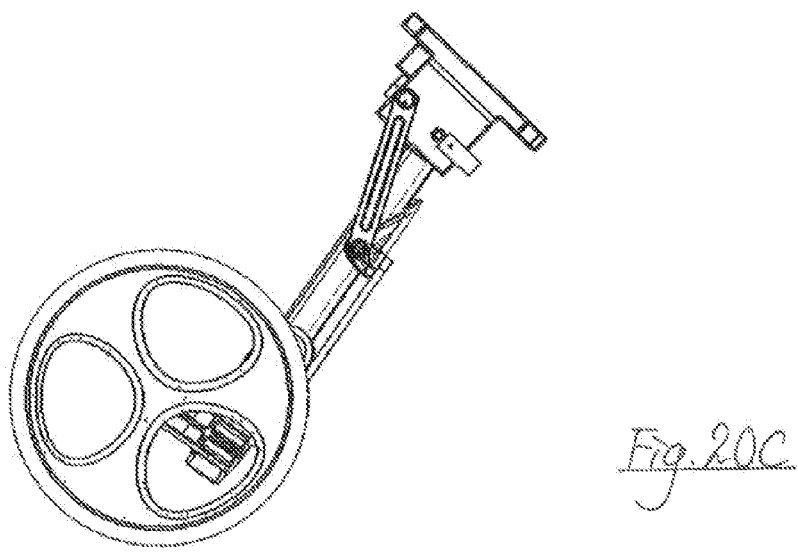
FIG. 20C is a side view of the rear wheel unit of FIG. 20A.
Figure 22:
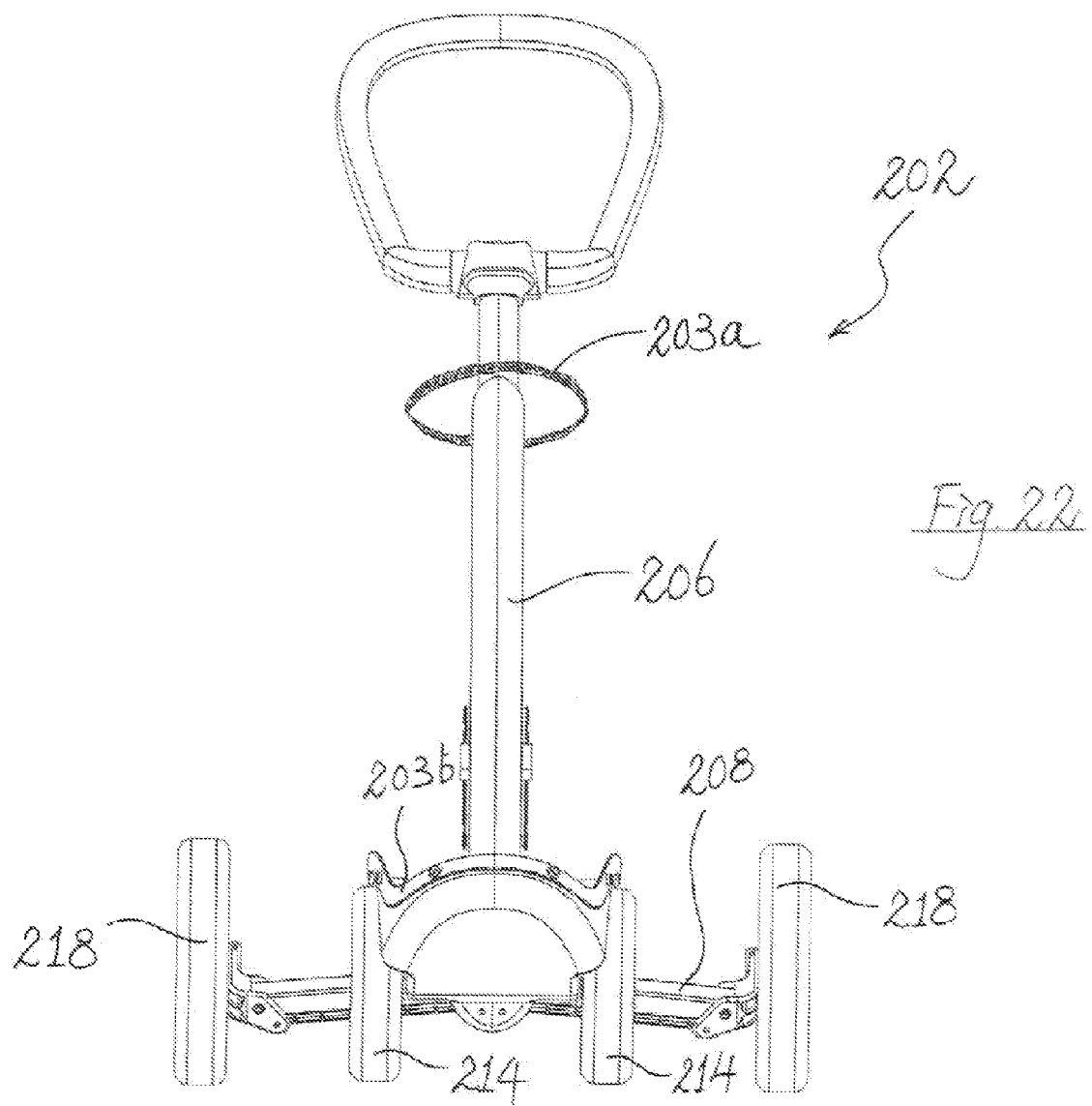
FIG. 22 is a front view of the golf bag cart unit of FIG. 21.
Figure 23:
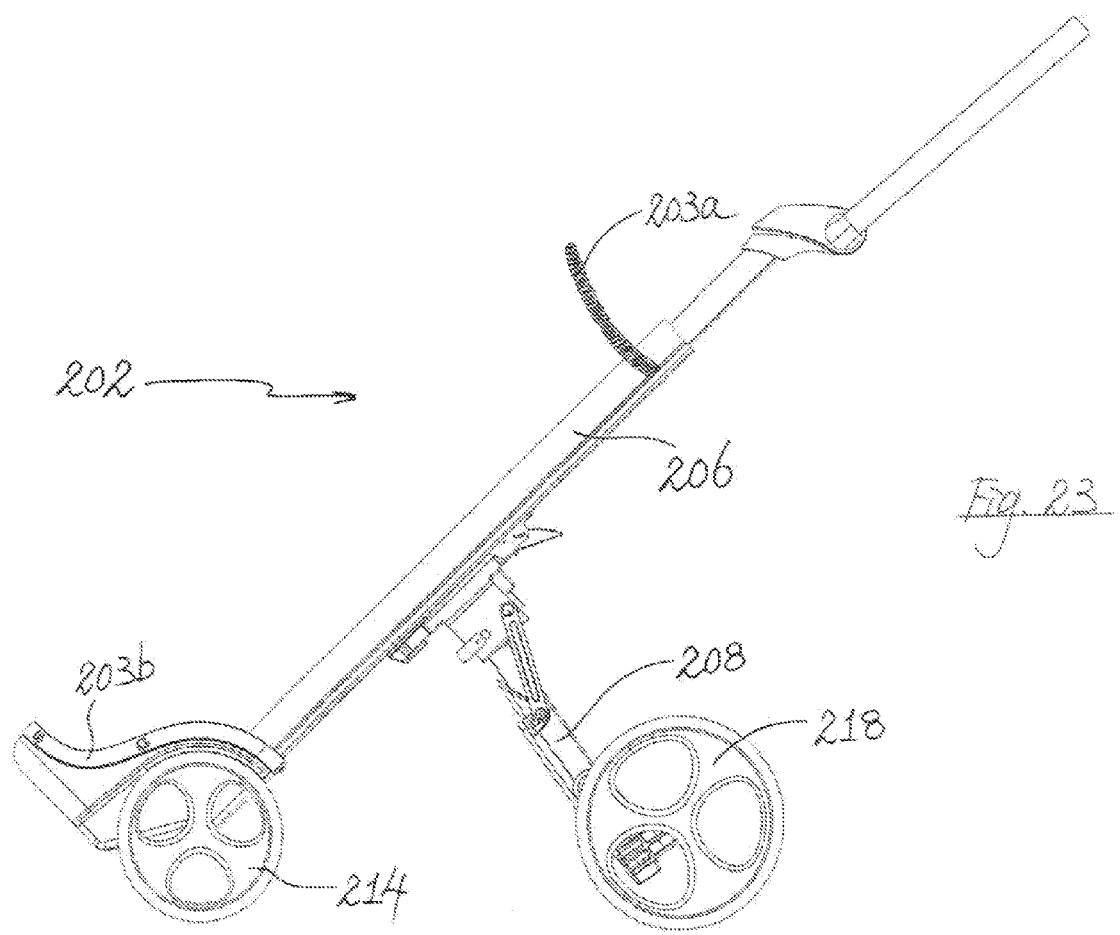
FIG. 23 is a side view of the golf bag cart unit of FIG. 21.
Figure 24:
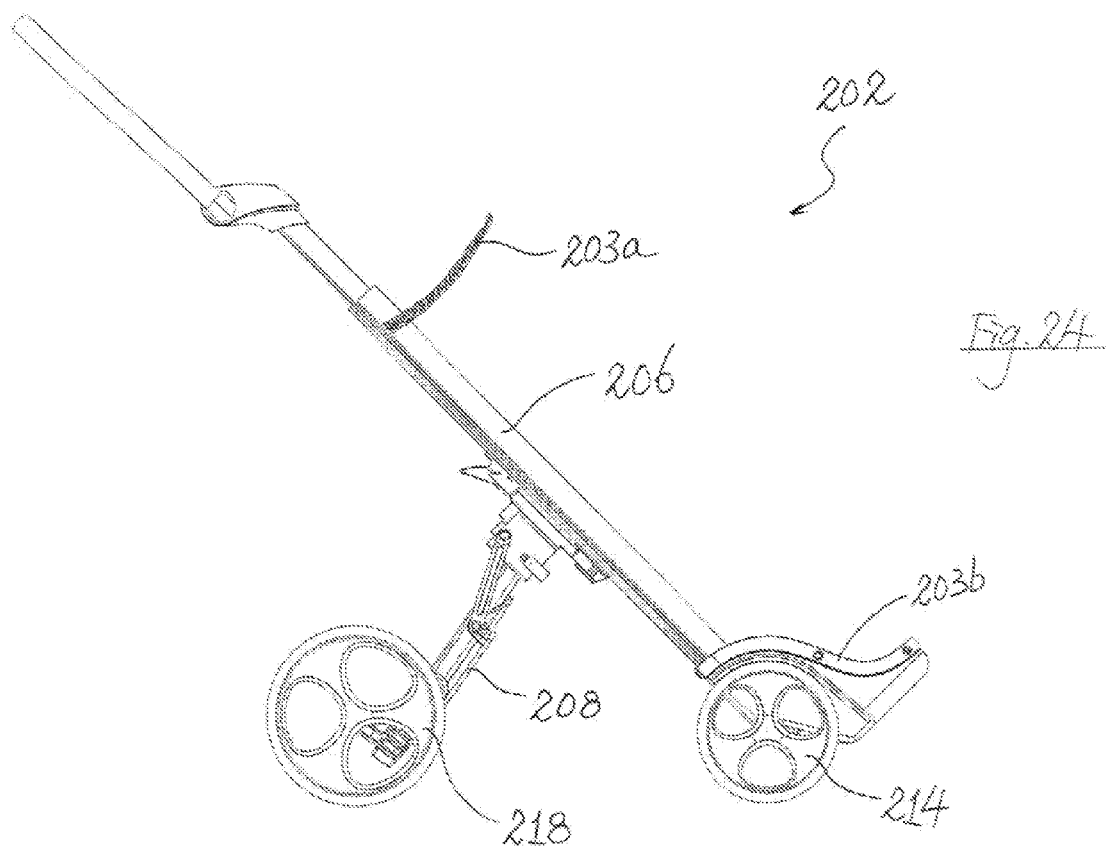
FIG. 24 is another side view of the golf bag cart unit of FIG. 21.
Figure 25:
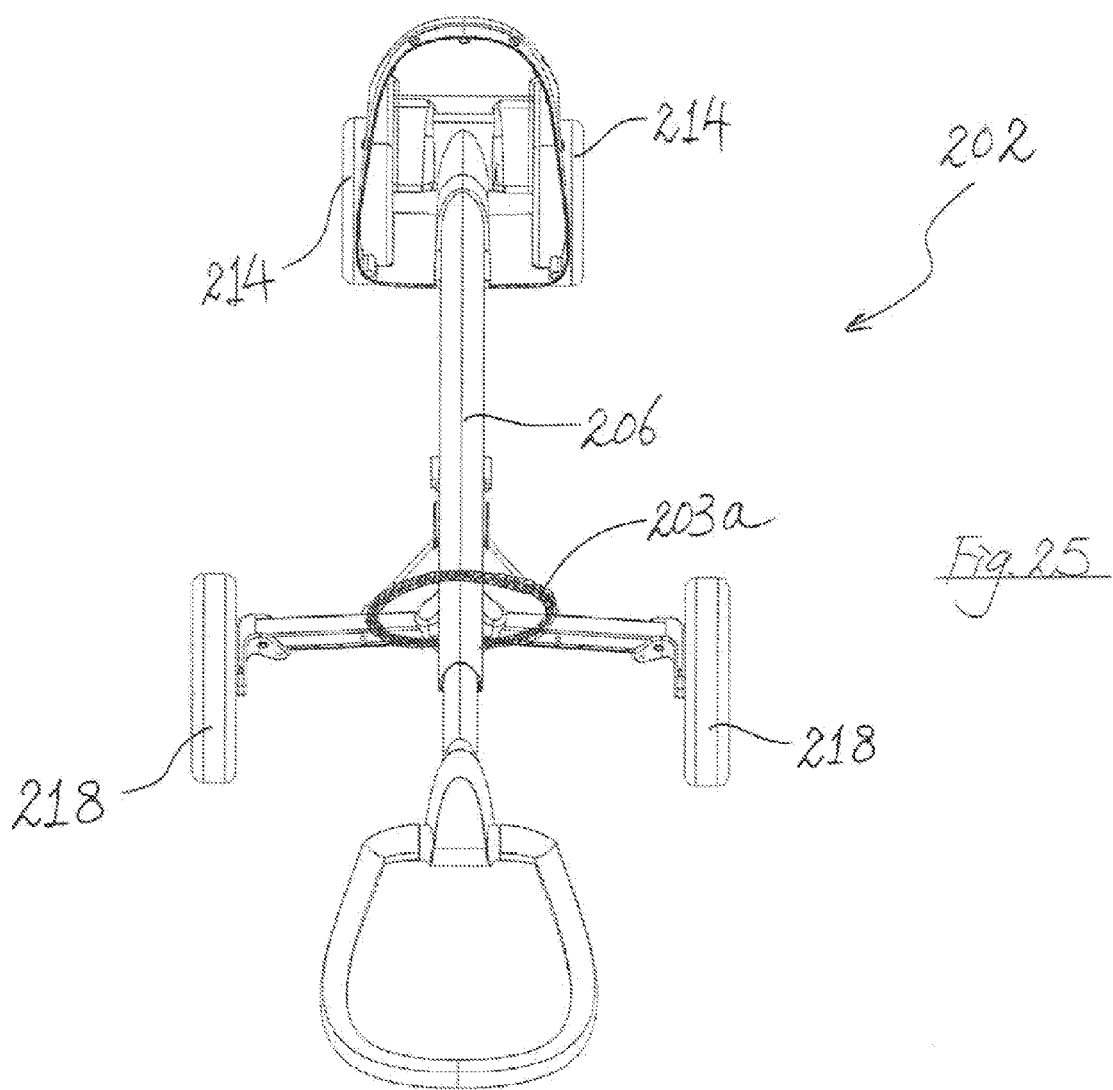
FIG. 25 is a top view of the golf bag cart unit of FIG. 21.
Figure 26:
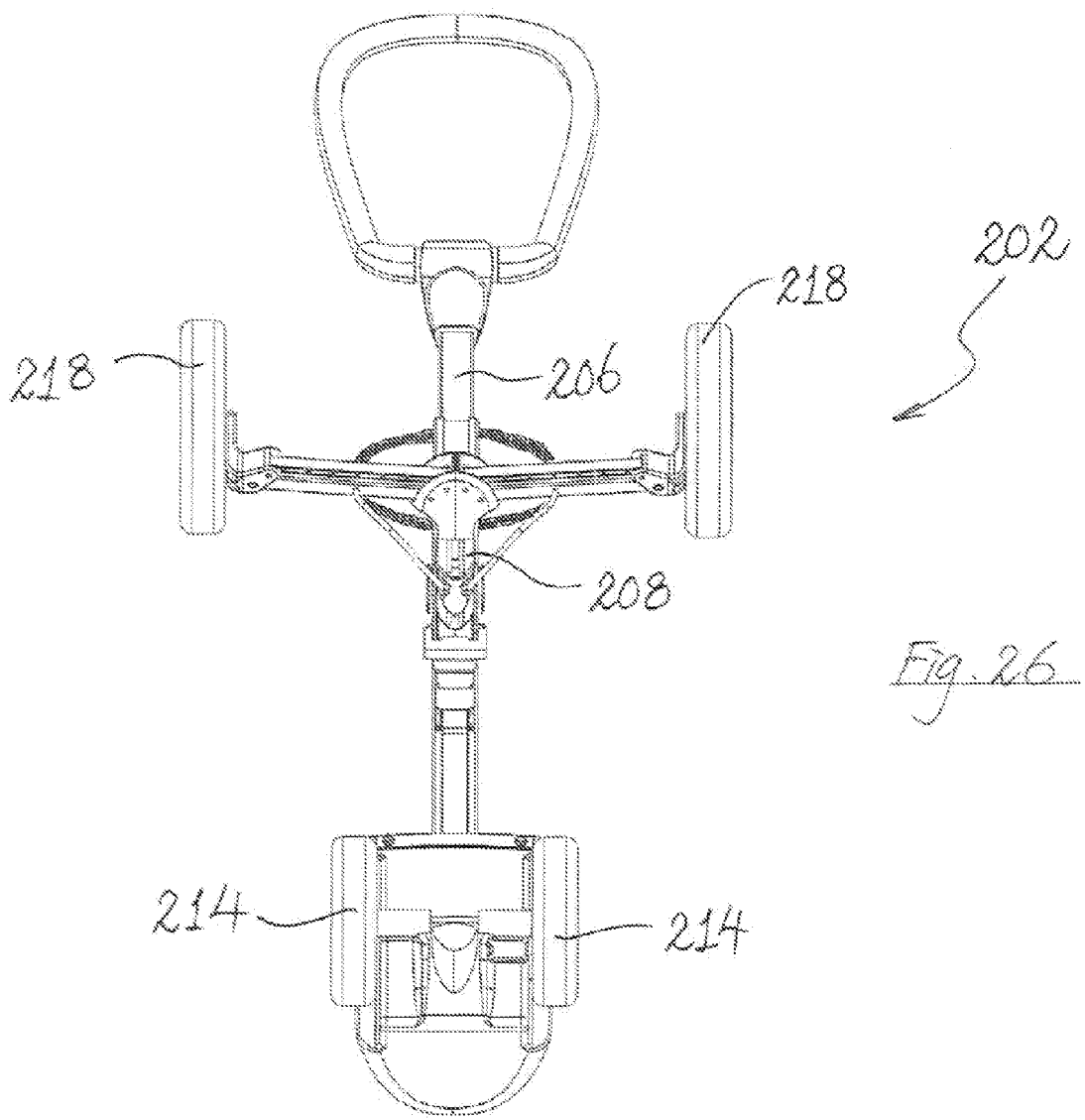
FIG. 26 is a bottom view of the golf bag cart unit of FIG. 21.

To move the rear wheel unit 108 from the fully-folded configuration shown in FIGS. 17A to 17C, through the partly-outstretched configuration shown in FIGS. 18A to 18C, then the further-outstretched configuration shown in FIGS. 19A to 19C, and eventually to the fully-outstretched configuration shown in FIGS. 20A to 20C, a user simply has to move the pivot lock 121 to the un-latched position (if the pivot lock 121 was originally in the latched position), lift the upper bracket 103a secured to the body 106. Before lifting of the upper bracket 103a, the push rods 140 and the lower tubes 138 are parallel to one another. Upon lifting of the upper bracket 103a by a user, the push rods 140, upon triggering of the gas springs in the lower tubes 138, will pull the slide block 134 forward as the lower tubes 138 and the push rods 140 are no longer parallel to one another, thus generating a resultant force vector. This forward movement of the slide block 134, as caused or assisted by the gas springs in the lower tubes 138, will cause the rear wheels 118 to pivot about the axis $L_P$-$L_P$ in the direction indicated by the arrow A in FIG. 18C, and will also pull the pull rods 136 connected between the slide block 134 and the outrigger tubes 128, thus stretching the rear wheels 118 away from each other. Thus, when the rear wheels 118 and the axis $L_R$-$L_R$ are moved from their respective fully-folded position to their respective fully-outstretched position, the rear wheels 118 move away from each other and towards the axis $L_F$-$L_F$ simultaneously. If the user would like to keep the golf bag cart 100 in this fully-expanded configuration, he/she may move the pivot lock 121 to the latched position to prevent pivotal movement of the rear wheels 118 relative to the body 106.

It should also be noted that each of the outrigger tubes 128 is parallel to the respective adjacent rod 130, such that the rear wheels 118 are always parallel to each other, i.e. have a common axis of rotation, whether they are in their fully-folded position, fully-outstretched position, or during movement between these two positions.

To move the rear wheel unit 108 from the fully-outstretched configuration shown in FIGS. 20A to 20C, through the further-outstretched configuration shown in FIGS. 19A to 19C, then the partly-outstretched configuration shown in FIGS. 18A to 18C, and eventually to the fully-folded configuration shown in FIGS. 17A to 17C, a user simply has to move the pivot lock 121 to the un-latched position (if it was originally in the latched position), press the upper bracket 103a. Upon pressing of the upper bracket 103a by a user, the push rods 140, again, upon triggering of the gas springs in the lower tubes 138, will push the slide block 134 rearward. This rearward movement of the slide block 134 will cause the rear wheels 118 to pivot about the axis $L_P$-$L_P$ in the direction opposite to that indicated by the arrow A in FIG. 18C, and also push the pull rods 136 connected between the slide block 134 and the outrigger tubes 128, thus folding the rear wheels 118 towards each other, until the push rods 140 and the lower tubes 138 are parallel to one another. Thus, when the rear wheels 118 and the axis $L_R$-$L_R$ are moved from their respective fully-outstretched position to their respective fully-folded position, the rear wheels 118 move towards each other and away from the axis $L_F$-$L_F$ simultaneously. If the user would like to keep the golf bag cart 100 in this fully-folded configuration, he/she may move the pivot lock 121 to the latched position to prevent pivotal movement of the rear wheels 118 relative to the body 106.

Although the invention has thus far been discussed with reference to an exemplary golf bag cart 100 in which the golf bag 104 is fixedly secured to the golf bag cart unit 102 between its upper bracket 103a and lower bracket 103b, it is envisaged that a stand-alone golf bag cart unit may be provided to which various bags (including, but not limited to, golf bags) may be detachably engaged. A golf bag cart unit according to a further embodiment of the present invention is thus shown in FIGS. 21 to 26, and generally designated as 202.

The golf bag cart unit 202 is structurally very similar to the golf bag cart unit 102 discussed above. The golf bag cart unit 202 also has an elongate body 206 to which a rear wheel unit 208 (which carries a pair of rear wheels 218) is detachably engaged. A pair of front wheels 214 are engaged with a lower longitudinal end of the body 206 for free rotation. A lower bracket 203b is also provided at the lower longitudinal end of the body 206 for support of a golf bag (not shown).

A major difference between the golf bag cart unit 202 and the golf bag cart unit 102 is that, adjacent an upper longitudinal end of the body 206 of the golf bag cart unit 202 is provided a fastener 203a, which may comprise a buckle, for releasable fastening purpose. A golf bag (not shown) may thus be detachably fastened to the golf bag cart unit 202 by the fastener 203a, with the golf bag resting on the body 206, and with the lower end of the golf bag received within the lower bracket 203b.

It should be understood that the above only illustrates and describes an example whereby the present invention may be carried out, and that modifications and/or alterations may be made thereto without departing from the spirit of the invention. It should also be understood that various features of the invention which are here, for brevity, described in the context of a single embodiment, may be provided or separately or in any suitable sub-combination.

What is claimed is:

1. A golf bag cart unit including:
   a body to which a bag is engageable, said body having a first longitudinal end and an opposite second longitudinal end,
   a first pair of wheels rotatable about a first axis of rotation at or adjacent said second longitudinal end of said body,
   a second pair of wheels rotatable about a second axis of rotation which is pivotable relative to said body between a folded position and an outstretched position,
   wherein when said second axis of rotation is in said outstretched position, said first pair of wheels and said second pair of wheels are adapted to support said body in a slanted orientation,
   wherein when said second axis of rotation is in said folded position, said first pair of wheels and said second pair of wheels are adapted to support said body in a generally horizontal orientation,
   wherein when said second axis of rotation moves from said outstretched position to said folded position, said second axis of rotation moves away from said first axis of rotation, and,
   wherein when said second axis of rotation is in said outstretched position, the distance between the outer rims of said second pair of wheels is larger than the distance between the outer rims of said first pair of wheels, and when said second axis of rotation is in said folded position, the distance between the outer rims of said second pair of wheels is close to or substantially identical to the distance between the outer rims of said first pair of wheels.

2. A golf bag cart unit according to claim 1 wherein when said second axis of rotation is in said folded position, said second axis of rotation is at or adjacent said first longitudinal end of said body.

3. A golf bag cart unit according to claim 1 wherein said second axis of rotation is substantially parallel to said first axis of rotation whether said second axis of rotation is in said folded position or in said outstretched position.

4. A golf bag cart unit according to claim 1 wherein said first axis of rotation is fixed relative to said body.

5. A golf bag cart unit according to claim 1 wherein during movement of said second axis of rotation from its folded position to its outstretched position, said pair of second wheels move away from each other and towards said first axis of rotation simultaneously.

6. A golf bag cart unit according to claim 1 wherein during movement of said second axis of rotation from its outstretched position to its folded position, said pair of second wheels move towards each other and away from said first axis of rotation simultaneously.

7. A golf bag cart unit according to claim 1 wherein said body includes a handle member movable relative to said body.

8. A golf bag cart unit according to claim 7 wherein said handle is slidable and pivotable relative to said body.

9. A golf bag cart unit according to claim 1 wherein said second pair of wheels are carried by a wheel unit which is detachably engaged with said body.

10. A golf bag cart unit according to claim 1 wherein said body is fixedly engaged with an upper bracket and a lower bracket for engagement with a bag.

11. A golf bag cart including a golf bag cart unit according to claim 1 engaged with a bag.

12. A golf bag cart according to claim 11 wherein said bag is detachable from said golf bag cart unit.

13. A golf bag cart according to claim 11 wherein said bag is fixedly engaged with said golf bag cart unit.

14. A golf bag cart according to claim 11 wherein, when said second axis of rotation is in said folded position, the length of said golf bag cart is no more than 50 inches.

15. A golf bag cart according to claim 11 wherein, when said second axis of rotation is in said folded position, the length of said golf bag cart is no more than 47 inches.

16. A golf bag cart according to claim 11 wherein said bag includes at least one side pocket, and wherein when said second axis of rotation is in said folded position, said at least one side pocket is between said first pair of wheels and said second pair of wheels.

* * * * *